United States Patent
Gong et al.

(10) Patent No.: US 9,584,608 B2
(45) Date of Patent: Feb. 28, 2017

(54) MONITORING INTERESTING SUBJECTS

(71) Applicant: INTERNATIONAL BUSINESS MACHINES CORPORATION, Armonk, NY (US)

(72) Inventors: Min Gong, Shanghai (CN); Guoqiang Hu, Shanghai (CN); Yi Qi, Shanghai (CN); Yu Wang, Shanghai (CN); Junchi Yan, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 14/297,770

(22) Filed: Jun. 6, 2014

(65) Prior Publication Data
US 2015/0006634 A1    Jan. 1, 2015

(30) Foreign Application Priority Data

Jun. 26, 2013   (CN) .......................... 2013 1 0257892

(51) Int. Cl.
*G06F 15/16* (2006.01)
*H04L 29/08* (2006.01)
(Continued)

(52) U.S. Cl.
CPC .............. *H04L 67/22* (2013.01); *G06Q 10/10* (2013.01); *G06Q 50/01* (2013.01); *H04L 65/403* (2013.01)

(58) Field of Classification Search
CPC ... H04L 12/1822; H04L 12/1813; H04L 51/32
(Continued)

(56) References Cited

U.S. PATENT DOCUMENTS

| | | | |
|---|---|---|---|
| 8,918,468 B1* | 12/2014 | Fisher ................. | H04M 3/5191 705/319 |
| 2011/0179020 A1* | 7/2011 | Ozzie .................. | G06F 17/3089 707/723 |

(Continued)

OTHER PUBLICATIONS

Lin, Cindy Xide et al., PET: A Statistical Model for Popular Events Tracking in Social Communities, ACM 978-1-4503-0055-110/07, KDD '10 Jul. 25-28, 2010, Washington DC, USA.
(Continued)

*Primary Examiner* — Kristie Shingles
(74) *Attorney, Agent, or Firm* — Mercedes Hobson

(57) ABSTRACT

Methods and systems for monitoring interesting subjects. A method including: selecting, based on a first collection of interesting subjects, a set of critical nodes including at least one critical node which participates in one or more interesting subjects in the first collection; and monitoring contents posted by the one or more critical nodes in the set so as to find a second collection of interesting subjects. The set of critical nodes which participate in one or more interesting subjects in the first collection of interesting subjects is selected based on the first collection, as objects to be monitored, thereby reducing the number of contents posted by the nodes to be monitored as compared with monitoring all the user nodes, so that interesting subjects such as hot news or hot events can be found in real time with high efficiency and low cost.

16 Claims, 3 Drawing Sheets

(51) Int. Cl.
*H04L 29/06* (2006.01)
*G06Q 50/00* (2012.01)
*G06Q 10/10* (2012.01)

(58) Field of Classification Search
USPC .......................................................... 709/204
See application file for complete search history.

(56) References Cited

U.S. PATENT DOCUMENTS

| | | | |
|---|---|---|---|
| 2012/0066212 A1* | 3/2012 | Jennings | G06F 17/30144 707/723 |
| 2012/0079020 A1* | 3/2012 | Park | H04L 51/046 709/204 |
| 2012/0245925 A1 | 9/2012 | Guha | |
| 2012/0271829 A1 | 10/2012 | Jason | |
| 2013/0125247 A1* | 5/2013 | Sprague | G06F 21/60 726/28 |

OTHER PUBLICATIONS

Aggarwal, Charu C. et al., Event Detection in Social Streams, Proceedings of SIAM International Conference on Data Mining, 2012.
Weng, Jianshu et al., Event Detection in Twitter, Hewlett-Packard Development Company, L.P., Jul. 6, 2011.
Petrovic, Sasa et al., Streaming First Story Detection with Application to Twitter, 2010 Annual Conference of North American Chapter of the ACL, pp. 181-189, Jun. 2010.

\* cited by examiner

MONITORING INTERESTING SUBJECTS

CROSS-REFERENCE TO RELATED APPLICATION

This application claims priority under 35 U.S.C. §119 from Chinese Patent Application No. 201310257892.9 filed Jun. 26, 2013, the entire contents of which are incorporated herein by reference.

BACKGROUND OF THE INVENTION

Field of the Invention

The present disclosure relates to method and system for monitoring interesting subjects, and more specifically, to method and system for monitoring interesting subjects by selecting critical nodes among social networks.

Description of Related Art

With the emergence of social networks such as Twitter, MicroBlog or the like, information sharing and communication among people becomes more and more convenient. People can post new posts, forward or comment posts posted by other people on the social networks so as to share information on news or real-time events and exchange their opinions with other people. It is the that Twitter has more than 500 millions active users and more than about 340 millions tweet posts generated daily. The Sina Weibo (microblog) also has more than 300 millions registered users and about 100 millions microblogs generated daily. Monitoring hot news or events among these posts or microblogs can help decision makers know public opinions, commercial trends, or the like. However, it is hard to monitor interesting subjects such as hot news or events among such huge amount of posts or microblogs. A conventional method for monitoring interesting subjects is performed by retrieving all the posts or microblogs from all the user nodes and performing content processing, such as keyword detection, on all the posts or microblogs to find interesting subjects such as hot news or events. However, such a huge amount of content processing is time consuming and inefficient.

SUMMARY OF THE INVENTION

According to one aspect of the present invention, there is provided a method for monitoring interesting subjects including selecting, based on a first collection of interesting subjects, a set of critical nodes including at least one critical node which participates in one or more interesting subjects in the first collection, and monitoring contents posted by the one or more critical nodes in the set so as to find a second collection of interesting subjects.

According to another aspect of the present invention, there is provided a system for monitoring interesting subjects including selecting means configured to select, based on a first collection of interesting subjects, a set of critical nodes including at least one critical node which participates in one or more interesting subjects in the first collection; and monitoring means configured to monitor contents posted by the one or more critical nodes in the set so as to find a second collection of interesting subjects.

According to the aspects of the present invention, the set of critical nodes including at least one critical node which participates in one or more interesting subjects in the first collection of interesting subjects is selected based on the first collection, as objects to be monitored, thereby reducing the number of contents posted by the nodes to be monitored as compared with monitoring all the user nodes, so that interesting subjects such as hot news or hot events can be found in real time with high efficiency and low cost.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
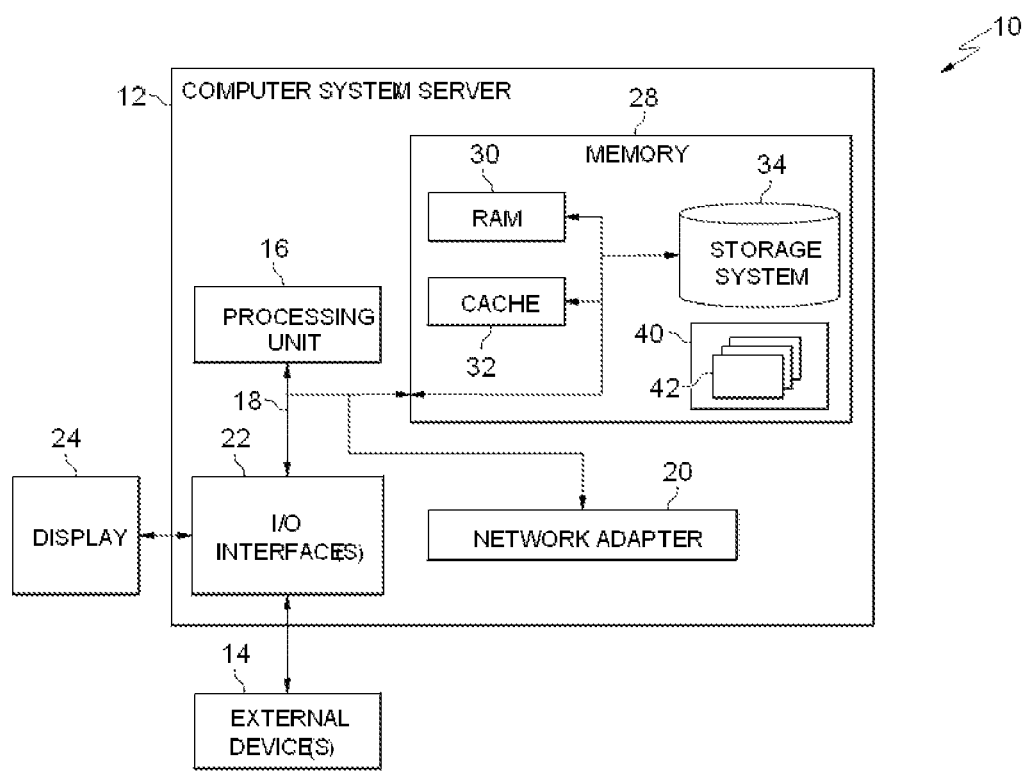
FIG. 1 shows a block diagram of an exemplary computer system/server 12 which is applicable to implement the embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present disclosure is shown. The computer system/server 12 shown in FIG. 1 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the disclosure as described herein.

Computer system/server 12 can also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
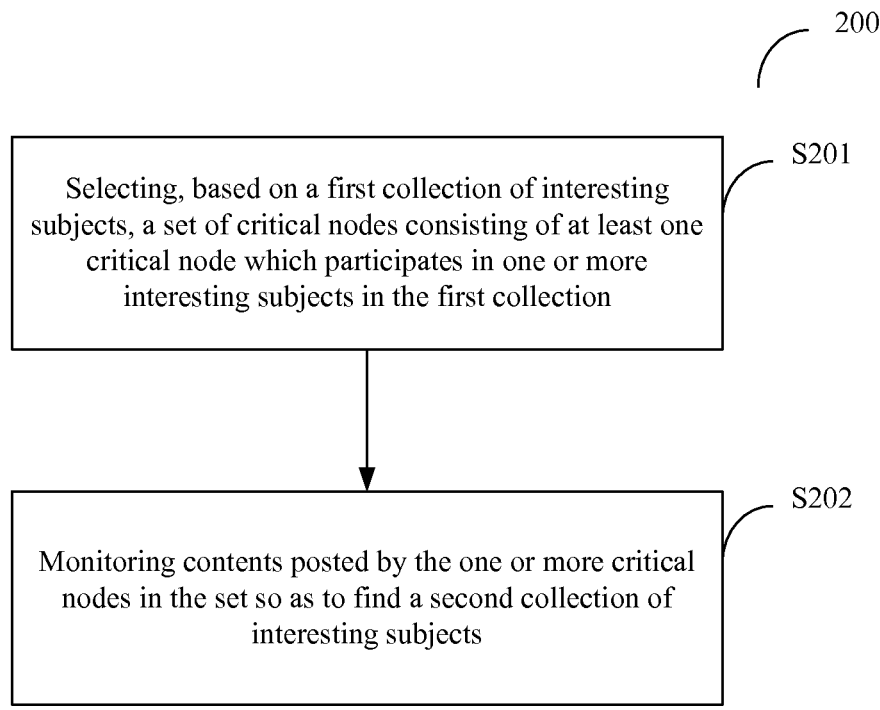
FIG. 2 shows a flow chart of a method for monitoring interesting subjects according to an embodiment of the present disclosure.

Now with reference to FIG. 2, FIG. 2 shows a flow chart of a method 200 for monitoring interesting subjects according to an embodiment of the present disclosure. As shown in FIG. 2, the method 200 for monitoring interesting subjects comprises: step S201 of selecting, based on a first collection of interesting subjects, a set of critical nodes including at least one critical node which participates in one or more interesting subjects in the first collection; and step S202 of monitoring contents posted by the one or more critical nodes in the set so as to find a second collection of interesting subjects.

According to this embodiment of the present invention, the set of critical nodes including at least one critical node which participates in one or more interesting subjects in the first collection of interesting subjects is selected based on the first collection, as objects to be monitored, thereby reducing the number of contents posted by the nodes to be monitored as compared with monitoring all the user nodes, so that interesting subjects such as hot news or hot events can be found in real time with high efficiency and low cost.

It is to be noted that in one embodiment, the first collection of interesting subjects can be a collection of interesting subjects known within a first specific time period $T_1$, which can be obtained from the following information sources in various well-known manners: for example, known news from news programs such as CCTV or the like, known information on hot news rankings from news portal websites such as Sina, Sohu or the like, known information on keyword search rankings from search engines such as Baidu, Google, or the like, known information on hot, focused news and events rankings from social networks such as Sina, Tencent Microblog, Twitter, Kaixin.com or the like, which are accumulated in the first specific time period $T_1$ (e.g., in two days of Saturday and Sunday). That is, the first collection of interesting subjects known within the first specific time period $T_1$ can include one or more of: hot news from medias, search event ranking from search websites, hot events from social networks within the first specific time period $T_1$. By the way, the first collection of interesting subjects can also be obtained by way of other external guidance information. As such, this first collection of interesting subjects can be used as a basis for selecting a few critical user nodes from all the user nodes. As an example, it is assumed the first collection of interesting subjects includes ten interesting subjects {S1, S2, . . . , S10}.

In an embodiment, the second collection of interesting subjects can be a collection of interesting subjects found within a second specific time period $T_2$ which is different from the first specific time period $T_1$. This is merely an example, and the second collection of interesting subjects can be a collection which is different from the first collection of interesting subjects in term of timing (as described above), or a collection within the same time period ($T_1$ is the same with $T_2$), which is different from the first collection of interesting subjects in term of contained interesting subjects. For example, in the case where the set of critical nodes is obtained by way in the first collection of interesting subjects collected within the first specific time period $T_1$, the second collection of interesting subjects for new hot news or events within a time period (e.g., the second specific time period $T_2$) after the first specific time period $T_1$ can be found by monitoring contents posted by the set of critical nodes within the time period (e.g., the second specific time period $T_2$) after the first specific time period $T_1$. Optionally, for example, in the case where the set of critical nodes is obtained by way in the first collection of interesting subjects collected within the first specific time period $T_1$, the second collection which is different from the first collection of interesting subjects in term of contained interesting subjects can also be found by monitoring contents posted by the set of critical nodes within the first specific time period $T_1$ ($T_1$ is the same with $T_2$). In all, the term "the second collection of interesting subjects" is not limited to the collection which is different from the first collection in term of timing (because some hot news or events can draw widespread attention continuously, for example, the first and second collections within different time periods can have the same contained subjects), and can also include the collection which is different from the first collection in term of the contained subjects (for example, the first and second collection containing different subjects can have the same timing). By the way, in the embodiments of the present disclosure, the description is made by using the example in which "the second collection of interesting subjects" is the collection which is newer in term of timing than the first collection, but the present invention is not limited thereto.

In an embodiment, the step S201 can be performed based on one or more of: a limit $L_1$ to the number $N_{node}$ of critical nodes in the set to be selected and a limit $L_2$ to the number $N_{post}$ of contents posted by the critical nodes in the set to be selected. That is to say, in the selecting step for selecting the set of critical nodes, the number of the critical nodes and the number of the contents they posted can be constrained so as to reduce the workload for monitoring these critical modes and the contents they posted, reduce the cost, and accelerate the finding of the interesting subjects. By the way, these constrains are not necessary and whether to constrain, what constrains should be used or the like can be determined based on practical circumstances.

It is to be noted that the nodes "posting" contents mentioned in the present disclosure can include the user nodes creating new contents, forwarding contents posted by other user nodes, commenting contents posted by other user nodes and so on. However, the "posting" is not limited thereto and "posting" contents can also include participating in some hot activity discussion (e.g. an interview of a popstar), adding some keyword identifiers relating to some hot events or news when creating a post (e.g. "#A Israelite Traveler Took a Photo of a Mermaid #") and any other manners related with "generating" contents which may occur in the future.

In this way, by using the various known hot news and event as the first collection of interesting subjects, a few critical user nodes participating in the known interesting subjects can be selected based on these known interesting subjects, thereby assuming that such selected few critical user nodes can be the active users participating in the known hot news and events and it could also be inferred that such active users can continuously pay attention to new hot news and events. In that case, monitoring the contents posted by the few active critical users can find the second collection of interesting subjects including new hot news and events more quickly and effectively with low cost.

In one embodiment, the step S201 of selecting, based on a first collection of interesting subjects, a set of critical nodes including at least one critical node which participates in one or more interesting subjects in the first collection can include: step S2011 (not shown in drawings) of obtaining a plurality of participating nodes which participate in one or more interesting subjects in the first collection; and step S2012 (not shown in drawings) of selecting, from the plurality of participating nodes, a set including at least one participating node that satisfies a first specific condition, as the set of critical nodes.

As described above, the participating nodes which participate in a certain interesting subject can be the nodes which post contents related to this interesting subject within a third specific time period $T_3$ since the interesting subject was posted for the first time. For example, if a participating node posts, forwards or comments an interesting subject $S_1$ in, for example, a relatively short time period since this interesting subject $S_1$ was posted for the first time, it can indicate to an extent that this participating node is active for this interesting subject $S_1$. By the way, setting the length of the third specific time period $T_3$ can adjust the activeness degree of the participating nodes. For example, the shorter $T_3$ is, more active the obtained participating node is. By the way, the present invention is not limited thereto and can obtain participating nodes which participate in the interesting subjects in other manners, for example, by checking whether the contents posted by the nodes relate to the keywords of the interesting subjects, checking whether the user nodes participate in, for example, a hot activity discussion organized on social networks about some interesting subjects, and any other participating manners that may occur in the future. In addition, the participating nodes which participate in the interesting subjects can be obtained in other time periods. For example, the participating nodes can also be the nodes which post the contents related to the interesting subjects in a period during which a discussion on the interesting subjects is relatively active or the most active, and so on. By the way, the participating nodes can be independent from the time and can be any nodes as long as it participates in a discussion on the interesting subjects. Those skilled in the art can also conceive many other implementations for defining and obtaining the participating nodes.

The step S2012 can further reduce the number of contents posted by the nodes to be monitored. In particular, in the step S2012, a set of participating nodes that satisfy a first specific condition (normally less than all the participating nodes) is selected from all the participating nodes that participate in the first collection of interesting subjects, as the set of critical nodes, and thus the number of contents to be monitored can be reduced by monitoring a set of nodes less than all the participating nodes.

By the way, the step S2012 is not a necessary step, and the step S201 can also include only the step S2011 of selecting all the participating nodes that participate in the first collection of interesting subjects, because the number of all the participating nodes thus selected is still smaller than the number of all the registered user nodes, and it can realize the effect of reducing the number of contents to be monitored to an extent.

In one embodiment, the first specific condition in the step S2012 can include making coverage gain for the set including the participating nodes to cover the first collection satisfy one of the followings: the coverage gain being larger than a first specific threshold; and the coverage gain is the largest. Herein, the coverage gain can represent the degree to which the contents posted by the set including the participating nodes cover the first collection of interesting subjects. If the coverage gain is larger, it indicates the degree to which the contents posted by the set including the participating nodes cover the first collection of interesting subjects is wider (i.e., monitoring the contents posted by the set of participating nodes can obtain more comprehensive interesting subjects).

In one embodiment, in the step S2012, the coverage gain for the set of participating nodes to cover the first collection can be calculated through the formula: $G=\alpha R_{covered}+\beta R_{uncovered}$, wherein G represents the coverage gain, $\alpha$ and $\beta$ represent weight constants, respectively, $R_{covered}$ represents an efficiency coefficient related to the number of the posted contents relevant to the interesting subjects covered by the set, and $R_{uncovered}$ represents an extent coefficient related to the number of the posted contents relevant to the interesting subjects not covered by the set. Herein, the coverage gain G for the set of participating nodes to cover the first collection, which is calculated from the above formula, can reflect the degree to which the contents posted by the set including the participating nodes cover the first collection of interesting subjects. If the coverage gain is larger, it indicates the degree to which the contents posted by the set including the participating nodes cover the first collection of interesting subjects is wider (that is, monitoring the set of participating nodes can obtain more comprehensive interesting subjects). By the way, the above formula $G=\alpha R_{covered}+\beta R_{uncovered}$ is just an example, and those skilled in the art can also conceive other manners for reflecting the degree to which the contents posted by the set of participating nodes cover the first collection of interesting subjects. For example, G can be equal to the number of the posted contents relevant to the interesting subjects covered by the set, the number of the posted contents relevant to the interesting subjects not covered by the set, the number of the posted contents relevant to all the interesting subjects in the first collection of interesting subjects, or the like.

In one embodiment, in step S2012, "the interesting subjects covered by the set" can be the interesting subjects for which the number of the participating nodes in the set participating in the interesting subjects is larger than a second specific threshold $U_2$. For example, as described above, it is assumed that there are ten known interesting subjects $S_1, S_2, \ldots, S_{10}$. Assuming that in a certain set of participating nodes selected from all the participating nodes, which participate in these interesting subjects $S_1, S_2, \ldots, S_{10}$, the number of the participating nodes participating in the interesting subject $S_1$ is $A_1$, the number of the participating nodes participating in the interesting subject $S_2$ is $A_2, \ldots$, and the number of the participating nodes participating in the interesting subject $S_{10}$ is $A_{10}$, wherein $A_1 > U_2$, $A_{10} > U_2$. Thus it can be determined that the interesting subjects $S_1$ and $S_{10}$ are the interesting subjects covered by this set. On the contrary, "the interesting subjects not covered by the set" can be the interesting subjects for which the number of the participating nodes in the set participating in the interesting subjects is smaller than or equal to the second specific threshold $U_2$. In This example, they are the interesting subjects $S_2, \ldots, S_9$.

In one embodiment, the efficiency coefficient $R_{covered}$ and the extent coefficient $R_{uncovered}$ can be calculated through the following formula:

$$R_{covered} = \frac{N_{post}^c}{N_{post}^t}$$

and $$R_{uncovered} = \frac{N_{post}^u}{N_{post}^t * N^u}$$

wherein $N_{post}^c$ represents the number of the posted contents relevant to the interesting subjects covered by the set, $N_{post}^t$ represents the total number of all the contents posted by the set, $N_{post}^u$ represents the number of the posted contents relevant to the interesting subjects not covered by the set, and $N^u$ represents the number of the interesting subjects not covered by the set. By the way, these formulae are only examples, and those skilled in the art can conceive other implementations for reflecting the effect of the number of the posted contents relevant to the interesting subjects covered by the set and the number of the posted contents relevant to the interesting subjects not covered by the set on the coverage gain.

It can be seen that if $R_{covered}$ is larger, it can indicate that the efficiency of the participating nodes in the set paying attention to the first collection of interesting subjects is higher. That is to say, the participating nodes in the set can be relatively intensively pay attention to the covered interesting subjects in the first collection of interesting subjects. On the other hand, if $R_{uncovered}$ is larger, it can indicate that the extent of the participating nodes in the set paying attention to the first collection of interesting subjects is wider. That is to say, the participating nodes in the set can widely pay attention to other interesting subjects than those covered in the first collection. Therefore, the values of $\alpha$ and $\beta$ can be set based on the different preference on the efficiency of the attention or the extent of the attention.

In one embodiment, the step S202 of monitoring contents posted by one or more critical nodes in the set to find a second collection of interesting subjects can include step: S2021 (not shown in the drawings) of obtaining the contents posted by one or more critical nodes in the set within the second specific time period $T_2$; step S2022 (not shown in the drawings) of comparing the numbers of respective contents for one or more subjects contained in the one or more contents posted; and step S2023 (not shown in the drawings) of adding at least one subject of the following subjects from the one or more subjects to the second collection of interesting subjects: subjects for which the number of contents is larger than a third specific threshold $U_3$ and subjects for which the number of contents is of the largest ones.

Herein, the term of "one or more subjects contained in the posted contents" can refer to one or more subjects extracted from some posted contents (for example, some contents all contain a keyword for a certain subject, or some contents all contain complete information on a certain subject). For example, the subject of "an Israelite Traveler Took a Photo of a Mermaid" is extracted from the contents containing the keyword of "# an Israelite Traveler Took a Photo of a Mermaid #", the contents containing a complete news text on the subject that an Israelite traveler took a photo of the mermaid, the contents containing a video on the subject that an Israelite traveler took a photo of the mermaid, and so on. That is to say, the contents related to a certain subject may be not literally the same with each other, but only need to be related to this subject in a certain degree. Accordingly, one or more subjects such as "an Israelite Traveler Took a Photo of a Mermaid", "American Rivers are Overfilled with Carps", "#China New Generation of Voice# Singing of a Ten-year-old Girl Shocked Whole Audiences" or the like can be extracted from numerous posted contents.

With the steps S2021, S2022 and S2023 as described above, one or more subjects for which the number of contents related to the subject is relatively large (is larger than a certain threshold or is in the top few ones) can be found (as the second collection of interesting subjects). Such one or more subjects can be considered as hot interesting subjects, and thus the second collection of such hot interesting subjects can be found efficiently with low cost by monitoring a few critical nodes and the contents posted by them.

In one embodiment, optionally, the method 200 can further include step S203 (not shown in the drawings) of updating the set of critical nodes based on the second collection of interesting subjects. In particular, with the time lapsing, the second collection of interesting subjects can be found by monitoring the set of critical nodes within a certain time period (e.g. the second specific time period $T_2$ mentioned above). However, for example after this time period (e.g. the second specific time period $T_2$), some critical nodes which actively participated in the first collection of interesting subjects may no longer be the active users participating in the second collection of interesting subjects. Consequently, the activity in the set of critical nodes can be maintained by updating the set of critical nodes based on the second collection of interesting subjects. It is to be noted that this updating step S203 can be performed after the second specific time period $T_2$ as described. By the way, the basis for performing the updating is not limited to this second collection of interesting subjects, and can also be a certain known collection of interesting subjects obtained from known information sources such as current news portal websites, news medias, social websites, search websites and so on. The present invention is not limited thereto.

In one embodiment, the step S203 of updating the set of critical nodes based on the second collection of interesting subjects can include one or more of: deleting nodes satisfying a second specific condition; and adding new critical nodes which participate in one or more interesting subjects in the second collection. The implementation of adding new critical nodes in the step S203 can be similar to that of selecting the critical nodes in step S201, for example, by calculating the coverage gain or the like. By the way, the step S203 of updating the set of critical nodes is not limited thereto, and those skilled in the art can also conceive other detailed steps for updating the set of critical nodes, for example but not limited to deleting water-army nodes (which will be discussed below), deleting zombie nodes (which will be discussed below), and so on.

In one embodiment, the second specific condition in the step S203 can include one or more of: the condition where the quality of the node is smaller than a fourth specific threshold; and the condition where the qualities of the nodes are of the smallest ones. The quality of the node can represent the efficiency of finding one or more interesting subjects by monitoring the contents posted by this node. The better the quality of the node is, the higher the efficiency of finding one or more interesting subjects by monitoring this nodes is, that is, more interesting subjects can be found by monitoring less contents posted by this node. By the way, the second specific condition can be other conditions. For example, nodes which posted few posts can be considered to be deleted. For example, "the water-army nodes" or "the zombie nodes" (which will be further described below) can be considered to be deleted. Those skilled in the art can conceive other conditions as the second specific condition so as to delete some unnecessary nodes.

In one embodiment, in this step S203, the quality of the node can be calculated through the following formula:

$$Q(i) = a * \frac{N_{post}^S(i)}{N_{post}^S(all)} + b * \frac{N_{post}^S(i)}{N_{post}^{All}(i)},$$

wherein Q(i) represents the quality of the node i, a and b are constant weights, $N_{post}^S(i)$ represents the number of contents posted by the critical node i which are related with one or more interesting subjects S in the second collection, $N_{post}^S$ (all) represents the number of contents posted by all the critical nodes in the set which are related with one or more interesting subjects S in the second collection, and $N_{post}^{All}(i)$ represents the total number of all the contents posted by this critical node i. By the way, the method for calculating the quality of the node is not limited thereto, and those skilled in the art can conceive other methods for calculating the quality of the node so as to reflect the efficiency of finding one or more interesting subjects by monitoring contents posted by the node.

The "water-army node" mentioned above generally refers to the nodes which are generated for a certain commercial purpose. They usually do not or hardly participate in any discussion of hot news or events, but mainly post contents for the purpose of promoting a certain commercial product. The water-army nodes can be determined by one or more of: whether there are more than a specific number of the same sub-names among the account names of a plurality of nodes; and whether a node has intensely posted contents related with a commercial promotion subject within a short time period since the commercial promotion subject was created for the first time and the number of contents posted by this node which are related with interesting subjects is smaller than a specific amount. By the way, the method for determining water-army nodes is not limited thereto, and those skilled in the art can conceive other methods for determining water-army nodes.

The "zombie nodes" mentioned above generally refer to dummy user nodes which are registered for increasing the attention paid to a certain user node. Such zombie nodes can usually be determined by factors such as whether the number of contents posted by them is relatively small, whether the time interval between the contents posted by them is relatively long, whether they mostly forward the contents posted by other users but not create new contents by themselves, or the like. By the way, the approach for determining zombie nodes is not limited thereto, and those skilled in the art can also conceive other approaches for determining zombie nodes.

As such, the activity of the critical nodes in the set of critical nodes can be maintained by frequently updating the set of critical nodes so that new and hot interesting subjects can be found accurately in real time based on the updated set of the critical nodes.

Figure 3:
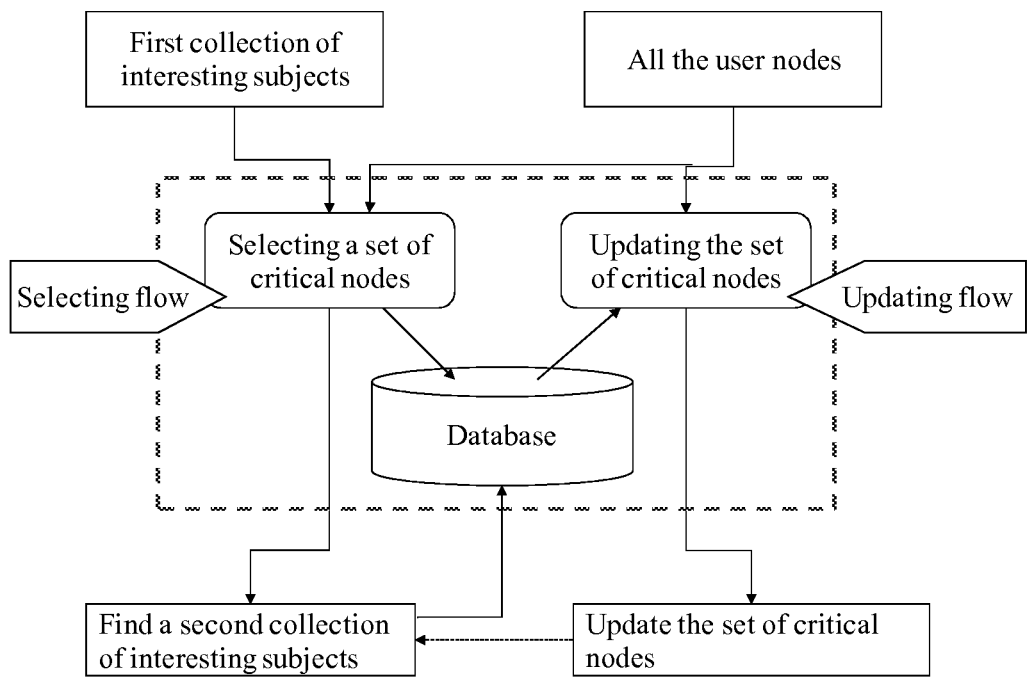
FIG. 3 shows an illustrative example of a framework for applying the method for monitoring interesting subjects as shown in FIG. 2.

FIG. 3 shows an illustrative example of a framework for applying the method for monitoring interesting subjects as shown in FIG. 2.

in particular, as shown in FIG. 3, in the step S201 of the method 200 shown in FIG. 2, a set of critical nodes including at least one critical node which participates in one or more interesting subjects in the first collection is selected from all the user nodes based on the first collection (the selecting flow shown in FIG. 3), and in step S202, the contents posted by the one or more critical nodes in the set are monitored so as to find the second collection of interesting subjects.

The information on the set of critical nodes and the information on the found second collection of interesting subjects can be input to a database (optionally) so as to be used in an optional updating flow for updating the set of critical nodes. In this updating flow, i.e., in the step S203 (not shown) of the method 200 shown in FIG. 2, the set of critical nodes can be updated based on the second collection of interesting subjects to obtain an updated set of critical nodes so that a collection of more interesting subjects can be found by continuously monitoring the updated set of critical nodes.

As such, the interesting subjects such as hot news or hot events can be found more efficiently in real time with low cost through the selecting flow and the potential updating flow shown in FIG. 3.

Figure 4:
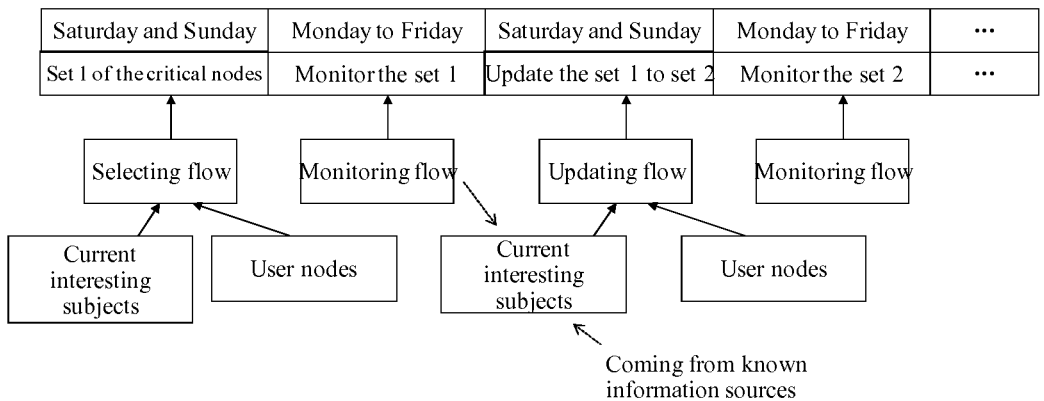
FIG. 4 shows an illustrative example of the timing for applying the method for monitoring interesting subjects as shown in FIG. 2.

FIG. 4 shows an illustrative example of the timing for applying the method for monitoring interesting subjects as shown in FIG. 2.

As shown in FIG. 4, in term of timing, the selecting flow of selecting the set 1 of critical nodes (that is, the example of step S201) is performed on all the user nodes based on the first collection of current known interesting subjects (for example obtained from the known hot news ranking information from Sina, Sohu or the like) on, for example, Saturday and Sunday (which is an example of the first specific time period $T_1$ as described above) so as to obtain the set 1 of critical nodes. On the subsequent Monday to Friday (which is an example of the second specific time period $T_2$), the set 1 of critical nodes is monitored so as to find the second collection of interesting subjects for the subsequent Monday to Friday (that is, the example of the step S202). On the subsequent Saturday and Sunday (which is another example of the first specific time period $T_1$ as described above), the set 1 of critical nodes can be updated based on the second collection of interesting subjects found on Monday to Friday as described above (for example, as current interesting subjects) or current known interesting subjects coming from the known information sources (the headlines on Sina or the headlines on MicroBlog) to obtain an updated set 2 of critical nodes, thereby continuously monitoring this updated set 2 of critical nodes to obtain updated interesting subjects for a further subsequent Monday to Friday, . . . , and so on. In addition to finding the interesting subjects such as hot news or hot events in real time with high efficiency and low cost, such an iterative flow of selecting, monitoring and updating enables realizing a real time self-updating so as to maintain the activity of the set of critical nodes so that new and hot interesting subjects can be found in real time and more accurately.

Figure 5:
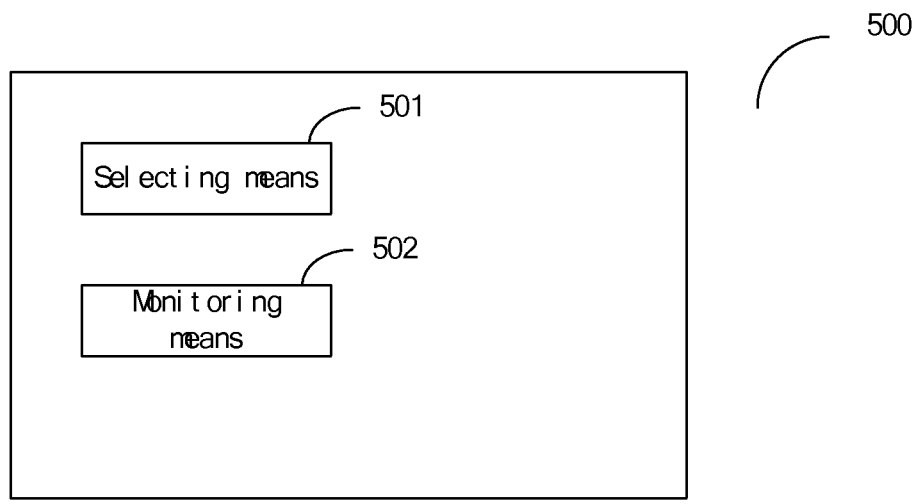
FIG. 5 shows a block diagram of a system for monitoring interesting subjects according to another embodiment of the present disclosure.

FIG. 5 shows a block diagram of a system 500 for monitoring interesting subjects according to another embodiment of the present invention.

The system 500 includes selecting means 501 configured to select, based on a first collection of interesting subjects, a set of critical nodes including at least one critical node which participates in one or more interesting subjects in the first collection; and monitoring means 502 configured to monitor contents posted by the one or more critical nodes in the set so as to find a second collection of interesting subjects.

According to this embodiment of the present invention, a set of critical nodes including at least one critical node which participates in one or more interesting subjects in a first collection of interesting subjects is selected by the selecting means 501 based on the first collection, as objects to be monitored by the monitoring means 502, thereby reducing the number of contents posted by the nodes to be monitored as compared with monitoring all the user nodes, so that the interesting subjects such as hot news or hot events can be found in real time with high efficiency and low cost.

In one embodiment, the selecting means 501 can perform the selection based on one or more of a limit to the number of critical nodes in the set to be selected and a limit to the total number of contents posted by the critical nodes in the set to be selected. That is, in the selecting process of the selecting means 501 selecting the set of critical nodes, the number of critical nodes and the number of contents they posted can be restrained so as to reduce the workload for monitoring the critical nodes and the contents they posted, reduce the cost and accelerate finding the interesting subjects.

In one embodiment, the first collection of interesting subjects can be a collection of interesting subjects known within the first specific time period $T_1$ which can be obtained from the following information sources in various well known manners: for example, known news from news programs such as CCTV, known information on hot news ranking from news portal websites such as Sina, Sohu or the like, known information on keyword search ranking from searching engines such as Baidu, Google, or the like, known information on hot focused news and events ranking from the social websites such as Sina Microblog, Tencent Microblog, Twitter, KaiXin.com or the like which are accumulated within the first specific time period $T_1$. The second collection of interesting subjects can be a collection of interesting subjects found within a second specific time period $T_2$ which is different from the first specific time period $T_1$. The term of "the second collection of interesting subjects" is not limited to the collection which is different from the first collection in term of timing, and can also include a collection which is different from the first collection in term of the contained subjects.

In one embodiment, the selecting means 501 can include means configured to obtain a plurality of participating nodes which participate in one or more interesting subjects in the first collection and means configured to select, from the plurality of participating nodes, a set including at least one participating node that satisfies a first specific condition, as the set of critical nodes. In one embodiment, the participating nodes which participate in an interesting subject can include the nodes which post the contents related to this interesting subject within a third specific time period $T_3$ since the interesting subject was posted for the first time.

In one embodiment, the first specific condition can include making coverage gain for the set including the participating nodes to cover the first collection satisfy one of the following: the coverage gain being larger than a first specific threshold; and the coverage gain is the largest, wherein the coverage gain can represent the degree to which the contents posted by the set including the participating nodes cover the first collection of interesting subjects.

In one embodiment, the coverage gain for the set of participating nodes to cover the first collection can be calculated through the formula: $G = \alpha R_{covered} + \beta R_{uncovered}$, wherein G represents the coverage gain, $\alpha$ and $\beta$ represent weight constants, respectively, $R_{covered}$ represents an efficiency coefficient related to the number of the posted contents relevant to the interesting subjects covered by the set, and $R_{uncovered}$ represents an extent coefficient related to the number of the posted contents relevant to the interesting subjects not covered by the set. The interesting subjects covered by the set can be the interesting subjects for which the number of the participating nodes in the set participating in the interesting subjects is larger than a second specific threshold, while the interesting subjects not covered by the set are the interesting subjects for which the number of the participating nodes in the set participating in the interesting subjects is smaller than or equal to the second specific threshold.

In one embodiment, it is possible that $$R_{covered} = \frac{N_{post}^c}{N_{post}^t}$$

and, $$R_{uncovered} = \frac{N_{post}^u}{N_{post}^t * N^u}$$

wherein $N_{post}^c$ represents the number of the posted contents relevant to the interesting subjects covered by the set, $N_{post}^t$ represents the total number of all the contents posted by the set, $N_{post}^u$ represents the number of the posted contents relevant to the interesting subjects not covered by the set, and $N^u$ represents the number of the interesting subjects not covered by the set.

In one embodiment, the monitoring means 502 can include means configured to obtain contents posted by the one or more critical nodes in the set within a second specific time period $T_2$, means configured to compare the numbers of respective contents for one or more subjects contained in the one or more posted contents and means configured to add at least one subject of the following subjects from the one or more subjects to the second collection of interesting subjects: subjects for which the number of contents is larger than a third specific threshold and subjects for which the number of contents is of the largest ones.

In one embodiment, the system 500 can further include updating means 503 (not shown) configured to update the set of critical nodes based on the second collection of interesting subjects.

In one embodiment, the updating means 503 (not shown) can include one or more of: means for deleting nodes satisfying a second specific condition and means configured to add new critical nodes which participate in one or more interesting subjects in the second collection.

In one embodiment, the second specific condition can include one or more of: the condition where the quality of a node is smaller than a fourth specific threshold and the condition where the quality of a node is of the lowest ones. The quality of a node can represent an efficiency of finding one or more interesting subjects by monitoring contents posted by this node.

In one embodiment, the quality of the node can be calculated through the following formula:

$$Q(i) = a * \frac{N_{post}^S(i)}{N_{post}^S(all)} + b * \frac{N_{post}^S(i)}{N_{post}^{All}(i)}$$

wherein Q(i) represents the quality of node i, a and b are constant weights, $N_{post}^S(i)$ represents the number of contents posted by the critical node i which are related with one or more interesting subjects S in the second collection, $N_{post}^S$(all) represents the number of contents posted by all the critical nodes in the set which are related with one or more interesting subjects S in the second collection, and $N_{post}^{All}(i)$ represents the total number of all the contents posted by this critical node i.

As such, the activity of the set of critical nodes can be maintained by updating the set of critical nodes based on the second collection of interesting subjects. By the way, the basis for performing the updating is not limited to this second collection of interesting subjects, and can also be a certain known collection of interesting subjects obtained from known information sources such as the current news portal websites, news medias, social websites, search websites and so on. As such, the activity of the critical nodes in the set of critical nodes can be maintained by frequently updating the set of critical nodes so that new and hot interesting subjects can be found accurately in real time based on the updated set of the critical nodes.

By the way, the system for monitoring interesting subjects according to the embodiments of the present invention is not limited to the apparatus as described above. Since the method for monitoring interesting subjects has been described in connection with FIGS. 2-4, those skilled in the art can understand that the system for monitoring interesting subjects can possess other means for performing the respective steps in the described method, details omitted here. In addition, the embodiments, advantages and effects are only examples but not intended to limit the present invention.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring interesting subjects, the method comprising:
    selecting, based on a first collection of interesting subjects, a set of critical nodes including at least one critical node which participates in one or more interesting subjects in the first collection;
    obtaining a plurality of participating nodes which participate in one or more interesting subjects in the first collection;
    selecting, from the plurality of participating nodes, a set including at least one participating node that satisfies a first specific condition, as the set of critical nodes, wherein the first specific condition includes making a coverage gain for the set that includes the participating nodes so that the first specific condition covers the first collection;
    wherein the coverage gain satisfies one of the following conditions: (i) the coverage gain is larger than a first specific threshold, and (ii) the coverage gain is the largest; and wherein the coverage gain represents a degree to which contents posted by the set including the participating nodes cover the first collection of interesting subjects;
    wherein the coverage gain for the set to cover the first collection is calculated through the following formula:

$$G = \alpha R_{covered} + \beta R_{uncovered}$$

wherein:
        G represents the coverage gain;
        $\alpha$ and $\beta$ represent weight constants, respectively;
        $R_{covered}$ represents an efficiency coefficient related to the number of the posted contents relevant to the interesting subjects covered by the set;
        $R_{uncovered}$ represents an extent coefficient related to the number of the posted contents relevant to the interesting subjects not covered by the set;
    the interesting subjects covered by the set are the interesting subjects for which the number of the participating nodes in the set participating in the interesting subjects is larger than a second specific threshold;
    the interesting subjects not covered by the set are the interesting subjects for which the number of the participating nodes in the set participating in the interesting subjects is smaller than or equal to the second specific threshold; and
    monitoring contents posted by the one or more critical nodes in the set so as to find a second collection of interesting subjects.

2. The method according to claim 1, wherein the selecting is performed based on one or more of:
    a limit to the number of critical nodes in the set to be selected; and
    a limit to the total number of contents posted by the critical nodes in the set to be selected.

3. The method according to claim 1, wherein:
    the first collection of interesting subjects is a collection of interesting subjects known within a first specific time period; and
    the second collection of interesting subjects is a collection of interesting subjects found within a second specific time period which is different from the first specific time period.

4. The method according to claim 1, wherein the participating nodes, which participate in the interesting subjects, include nodes that post contents related to these interesting subjects within a third specific time period since these interesting subjects were posted for the first time.

5. The method according to claim 1, wherein:

$$R_{covered} = \frac{N_{post}^c}{N_{post}^t}; \text{ and}$$

-continued $$R_{uncovered} = \frac{N_{post}^u}{N_{post}^t * N^u};$$

wherein:
$N_{post}^c$ represents the number of the posted contents relevant to the interesting subjects covered by the set;
$N_{post}^t$ represents the total number of all the contents posted by the set;
$N_{post}^u$ represents the number of the posted contents relevant to the interesting subjects not covered by the set; and
$N^u$ represents the number of the interesting subjects not covered by the set.

6. The method according to claim 1, wherein the step of monitoring contents posted by the one or more critical nodes in the set to find the second collection of interesting subjects, comprises:
obtaining one or more contents posted by the one or more critical nodes in the set within a second specific time period;
comparing the numbers of respective contents for one or more subjects contained in the one or more posted contents; and
adding, from the one or more subjects to the second collection of interesting subjects, at least one subject of the following group of subjects:
a subject for which the number of contents is larger than a third specific threshold; and
a subject for which the number of contents is of the largest.

7. The method according to claim 1, further comprising the step of updating the set of critical nodes based on the second collection of interesting subjects.

8. The method according to claim 7, wherein the step of updating the set of critical nodes based on the second collection of interesting subjects, comprises one or more of the following steps:
deleting nodes satisfying a second specific condition; and
adding new critical nodes that participate in one or more interesting subjects in the second collection.

9. The method according to claim 8, wherein the second specific condition includes one or more of the following conditions:
the condition where the quality of a node is smaller than a fourth specific threshold; and
the condition where the quality of a node is of the smallest ones;
wherein the quality of a node represents an efficiency for finding one or more interesting subjects by monitoring contents posted by this node.

10. The method according to claim 9, wherein the quality of a node is calculated through the following formula:

$$Q(i) = a * \frac{N_{post}^S(i)}{N_{post}^S(all)} + b * \frac{N_{post}^S(i)}{N_{post}^{All}(i)};$$

wherein:
Q(i) represents the quality of a critical node i, a and b are constant weights;
$N_{post}^S(i)$ represents the number of contents posted by the critical node i which are related with one or more interesting subjects S in the second collection;
$N_{post}^S(all)$ represents the number of contents posted by all the critical nodes in the set which are related with the one or more interesting subjects S in the second collection; and
$N_{post}^{All}(i)$ represents the total number of all the contents posted by the critical node i.

11. A system for monitoring interesting subjects, the system comprising:
a selecting means configured to select, based on a first collection of interesting subjects, a set of critical nodes including at least one critical node which participates in one or more interesting subjects in the first collection;
an obtaining means configured to obtain a plurality of participating nodes which participate in one or more interesting subjects in the first collection;
a second selecting means configured to select, from the plurality of participating nodes, a set including at least one participating node that satisfies a first specific condition, as the set of critical nodes, wherein the first specific condition includes making a coverage gain for the set that includes the participating nodes so that the first specific condition covers the first collection;
wherein the coverage gain satisfies one of the following conditions: (i) the coverage gain is larger than a first specific threshold, and (ii) the coverage gain is the largest; and wherein the coverage gain represents a degree to which contents posted by the set including the participating nodes cover the first collection of interesting subjects;
wherein the coverage gain for the set to cover the first collection is calculated through the following formula:

$$G = \alpha R_{covered} + \beta R_{uncovered}$$

wherein:
G represents the coverage gain;
α and β represent weight constants, respectively;
$R_{covered}$ represents an efficiency coefficient related to the number of the posted contents relevant to the interesting subjects covered by the set;
$R_{uncovered}$ represents an extent coefficient related to the number of the posted contents relevant to the interesting subjects not covered by the set;
the interesting subjects covered by the set are the interesting subjects for which the number of the participating nodes in the set participating in the interesting subjects is larger than a second specific threshold;
the interesting subjects not covered by the set are the interesting subjects for which the number of the participating nodes in the set participating in the interesting subjects is smaller than or equal to the second specific threshold; and
a monitoring means configured to monitor contents posted by the one or more critical nodes in the set so as to find a second collection of interesting subjects.

12. The system according to claim 11, wherein the selecting means performs the selecting based on one or more of the following conditions:
a limit to the number of critical nodes in the set to be selected; and
a limit to the total number of contents posted by the critical nodes in the set to be selected.

13. The system according to claim 11, wherein:
the first collection of interesting subjects is a collection of interesting subjects known within a first specific time period; and the second collection of interesting subjects is a collection of interesting subjects found within a second specific time period that is different from the first specific time period.

14. The system according to claim 11, wherein the monitoring means comprises:
  means configured to obtain one or more contents posted by the one or more critical nodes in the set within a second specific time period;
  means configured to compare the numbers of respective contents for one or more subjects contained in the one or more posted contents; and
  means configured to add, from the one or more subjects to the second collection of interesting subjects, at least one subject of the following group of subjects:
    subjects for which the number of contents is larger than a third specific threshold; and
    subjects for which the number of contents is of the largest ones.

15. The system according to claim 11, further comprising updating means configured to update the set of critical nodes based on the second collection of interesting subjects.

16. The method according to claim 11, wherein:

$$R_{covered} = \frac{N_{post}^c}{N_{post}^t}; \text{ and}$$

$$R_{uncovered} = \frac{N_{post}^u}{N_{post}^t * N^u};$$

wherein:

$N_{post}^c$ represents the number of the posted contents relevant to the interesting subjects covered by the set;

$N_{post}^t$ represents the total number of all the contents posted by the set;

$N_{post}^u$ represents the number of the posted contents relevant to the interesting subjects not covered by the set; and $N^u$ represents the number of the interesting subjects not covered by the set.

* * * * *